United States Patent

Cassie et al.

[15] 3,646,417

[45] Feb. 29, 1972

[54] DIGITAL SPEED SERVOMECHANISM

[72] Inventors: John V. Cassie, Longmont; Philip J. Lima, Boulder; Everette R. McCully, Northglenn, all of Colo.

[73] Assignee: International Business Machines Corporation, Armonk, N.Y.

[22] Filed: Mar. 25, 1971

[21] Appl. No.: 127,913

[52] U.S. Cl. .............................................................318/318
[51] Int. Cl. .........................................................H02p 5/16
[58] Field of Search.................318/312, 314, 318, 326, 327, 318/328, 341

[56] References Cited

UNITED STATES PATENTS

| | | | |
|---|---|---|---|
| 3,393,366 | 7/1968 | Shoop.....................................318/318 |
| 3,564,368 | 2/1971 | Kelling....................................318/314 |

*Primary Examiner*—Bernard A. Gilheany
*Assistant Examiner*—Thomas Langer
*Attorney*—Hanifin and Jancin and Francis A. Sirr

[57] ABSTRACT

The speed of rotation of a motor is controlled by a closed-loop digital speed or velocity servomechanism which derives distance information from a digital motor tachometer and derives time information from a counter arrangement, the counter being driven by a stable high-frequency oscillator. The value of the count at the time of occurrence of a tachometer pulse is a measure of motor speed and is used to determine the mode of motor energization which will occur until the time of next tachometer pulse, at which time a new motor energization decision is made.

Three counters are connected to be sequentially incremented by a relatively high-frequency oscillator. The motor whose speed is to be controlled drives a digital tachometer whose pulse output frequency increases with speed. The highest frequency output of the tachometer occurs when the motor is running at or slightly above the desired speed; however, this highest frequency is low when compared to the oscillator frequency. Each tachometer pulse initiates counting in the first counter and also initiates decoding or sampling of the count then in the second counter when the motor is fast, or decoding or sampling of the third counter when the motor is slow. This decoding or sampling determines the mode of motor energization which will exist until the occurrence of the next tachometer pulse, the period between adjacent tachometer pulses constituting a speed-error sampling period.

During the interval between adjacent tachometer pulses, a count first advances through the first counter, then into the second counter, and then, if the motor is slow, into the third counter. The occurrence of a tachometer pulse while the second counter is advancing indicates that the motor is fast, and the specific value of the count quantitatively indicates the amount of motor overspeed. The occurrence of a tachometer pulse at a later time, after the second counter has filled and the third counter is advancing, indicates that the motor is slow, and the value of the count quantitatively indicates the amount of motor underspeed.

The decoding function is completed as the first counter advances during the next speed-error sampling period. Before the first counter fills, to thereafter cause the second counter to advance, the decoding function is completed and the second and third counters are reset to an initial state, thereby conditioning them for their operation in this next speed-error sampling period.

During the initial acceleration interval, when the motor is rapidly accelerating from zero velocity toward the command or desired velocity, a given high-order count is preset into the third counter. The motor receives continuous energization until its velocity has increased to the desired velocity. At this time, the preset count in the third counter no longer exists, and the acceleration mode of energization of the motor is terminated.

17 Claims, 7 Drawing Figures

INVENTORS

JOHN V. CASSIE
PHILIP J. LIMA
EVERETTE R. MC CULLY

BY

*Francis A. Sirr*

ATTORNEY

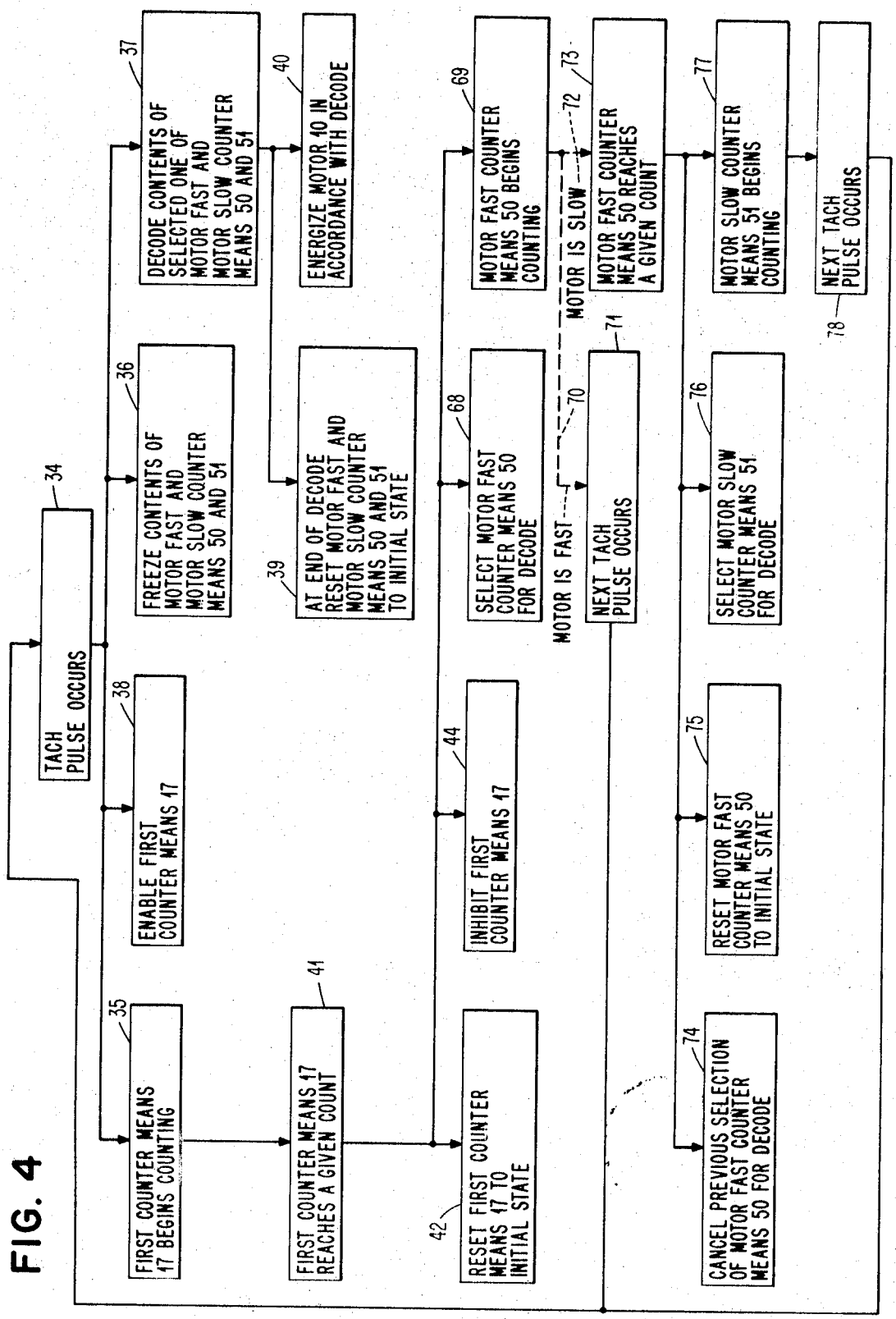

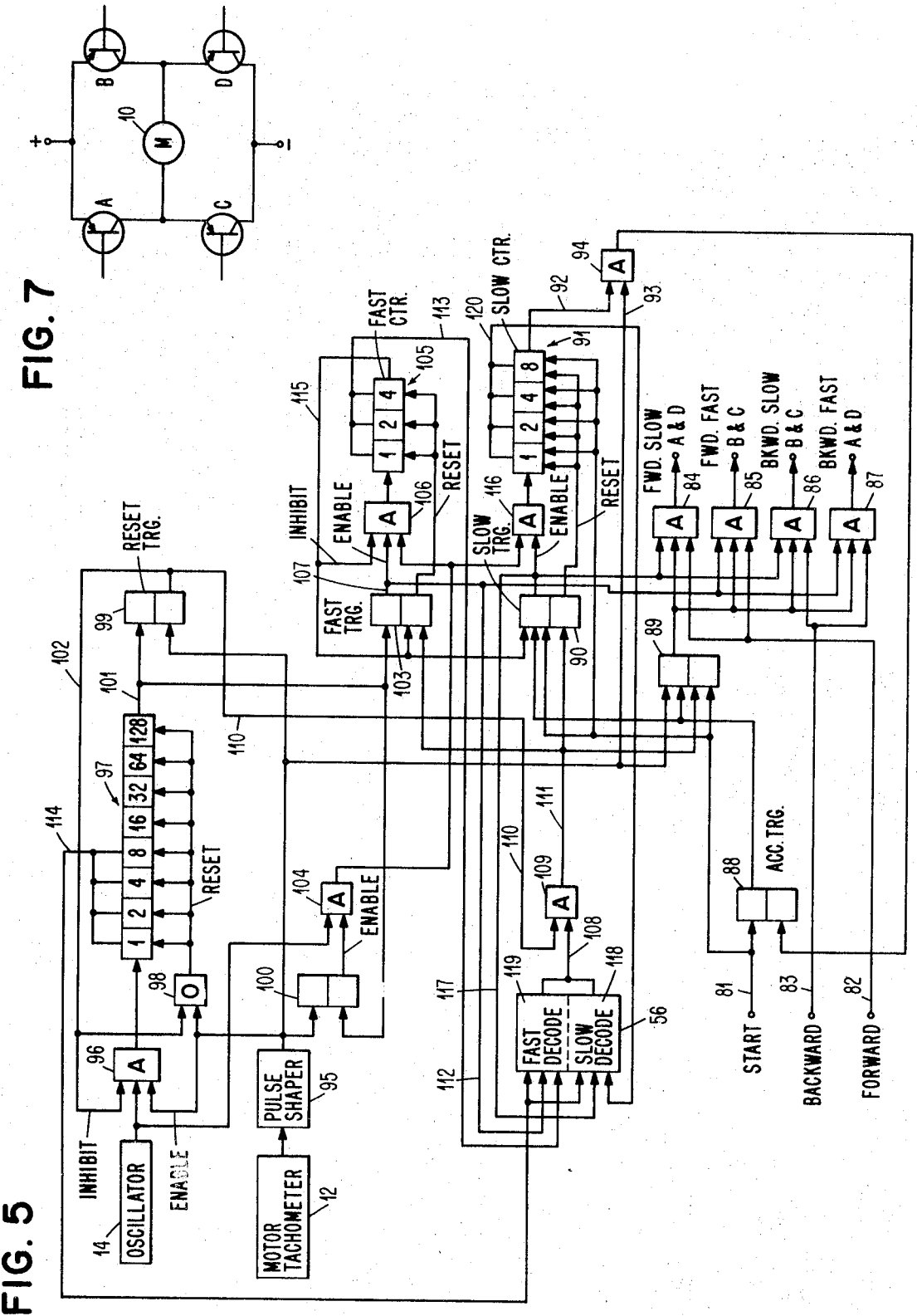

DIGITAL SPEED SERVOMECHANISM

BACKGROUND AND SUMMARY OF THE INVENTION

Digital speed servomechanisms are known wherein a bidirectional counter is incremented by a constant frequency oscillator, whose frequency is a function of the desired motor speed, and is decremented by the output pulses of a motor digital tachometer whose frequency is a function of the actual motor speed. The contents of the counter is thus a measure of speed-error and is utilized to determine the mode of motor energization.

Another type of digital speed servomechanism is known where a digital desired-speed signal is cyclically compared to a digital actual-speed signal to cyclically originate a digital speed-error signal. Each individual speed-error signal is stored and is subsequently compared to the next speed-error signal. This comparison of two speed-error signals, spaced in time by one sampling interval, is used to select the mode of motor energization which will continue until the next sampling interval.

Other digital speed servomechanisms are known which control the energization of a motor based on a frequency and/or a phase comparison between an oscillator frequency and the frequency of a motor driven tachometer.

Yet other digital speed servomechanisms are known wherein a high-frequency oscillator advances a counter between the occurrence of the individual pulses of a low-frequency motor driven tachometer. At each tachometer pulse, the state of the counter is effective to determine if the motor will remain energized, or if it will be deenergized to coast until the next tachometer pulse, whereupon a new drive-coast decision is made.

The present invention improves the prior art in that the present invention not only allows a decision to be made as to whether the motor is fast or slow, but also a quantitative decision is made as to the amount of the overspeed or underspeed condition.

More specifically, a first counter advances between the pulses of a motor driven digital tachometer. During the running interval, where speed error is nominal, this counter always reaches a given high-order count, whereupon a second counter means begins to count. Thus, the second counter means always has a count therein when a tachometer pulse occurs. This count is retained and is subsequently compared to the initial portion of next cycle of the first counter. This comparison, or decoding, is used to decide what type of energization to apply to the motor.

More specifically, the second counter means is divided into two counters, a motor-fast counter and a motor-slow counter. The count proceeds first into the motor-fast counter and then into the motor-slow counter. A gross decision as to the speed of the motor is made by noting which of the two counters is counting when a tachometer pulse occurs. A fine quantitative decision as to the amount of speed error is made by noting the value of the count in the then active counter.

This count is subsequently decoded with the advancing state of the first counter, since this counter began a new sampling period with the occurrence of the tachometer pulse. The decoding is used to control motor energization, and the decoding process is completed before the now advancing first counter reaches said given high order count. At the end of decoding, the first and second counters are reset to prepare them for their function in the new sampling period which is already underway.

The foregoing and other features and advantages of the invention will be apparent from the following more particular description of the preferred embodiments of the invention, as illustrated in the accompanying drawings.

BRIEF DESCRIPTION OF THE DRAWINGS

FIG. 4 is a flow chart which is helpful in understanding the operation of the apparatus of FIG. 3, FIG. 5 is a showing of a third embodiment of the present invention, this detailed showing, supporting the apparatus previously disclosed in FIGS. 1 and 3, FIG. 7 is a showing of a representative motor driver circuit which is controlled by the four output AND gates of FIG. 5.

DETAILED DESCRIPTION OF THE DRAWINGS

Figure 1:
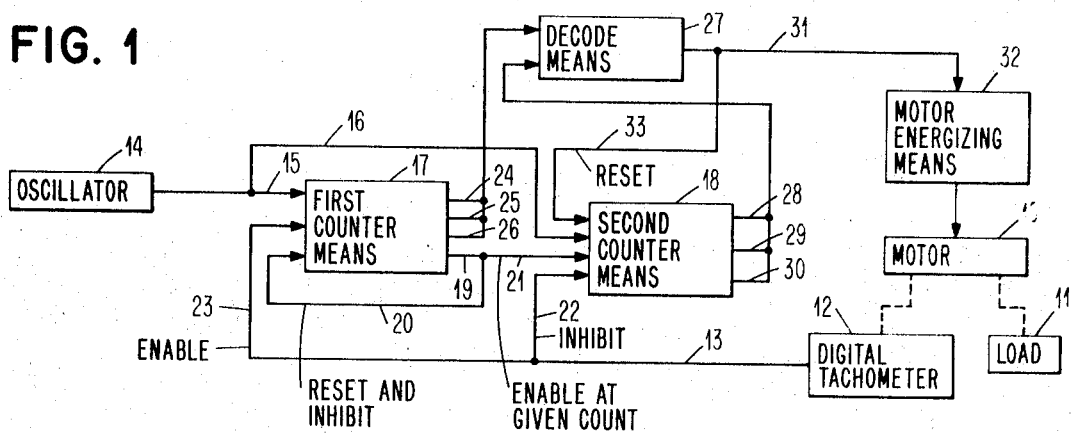
FIG. 1 is a showing of a first embodiment of the present invention.

Referring to FIG. 1, this figure discloses a first embodiment of the present invention wherein a digital speed servomechanism variably controls the energization of an electrically energizable member in the form of a direct current motor 10. This motor drives a load 11 and a digital tachometer 12. The output of tachometer 12, on conductor 13, is of a relatively low frequency, whose frequency increases as the speed of motor 10 increases. The signal on conductor 13 is the actual speed reference signal for the servomechanism.

The desired speed signal of the servomechanism is related to the frequency of an oscillator 14. This oscillator has a relatively high output frequency, as compared to the highest frequency which will occur on conductor 13. The output of oscillator 14 is connected by means of conductors 15 and 16 to first and second counter means 17 and 18. The output of oscillator 14 is effective to cause counter means 17 and 18 to incrementally advance under the control of other control stimulus, as will be described.

The digital speed servomechanism of FIG. 1 maintains the speed of motor 10 substantially constant, with only nominal variation about a desired command speed. First counter means 17 is constructed and arranged such that this counter means will always advance to a given high order count and an output will appear on conductor 19 between adjacent tachometer pulses on conductor 13. Two adjacent tachometer pulses on conductor 13 will occur with the shortest time spacing when motor 10 is experiencing an overspeed condition. Within the shortest time period which is to be expected between adjacent tachometer pulses, oscillator 14 is effective to advance first counter means 17 to a count indicated by an output on conductor 19.

At this count, conductor 19 is effective to apply a reset and inhibit input to first counter means 17 by way of conductor 20. Thus, first counter means 17 stops counting and is reset to an initial state, for example, a zero count. Also, the output on conductor 19 is effective to apply an enable input to second counter means 18 by way of conductor 21.

Prior to this time, second counter means 18 has not been counting. However, when first counter means 17 reaches the given high order count, second counter means 18 is enabled and this counter begins to advance by virtue of the oscillator input provided on conductor 16. The amount of time which expires from the occurrence of an output on conductor 19 to the next tachometer pulse on conductor 13 is a measure of the speed of motor 10. If the count in second counter means 18 is relatively low, the motor is overspeed. On the other hand, if the count in this counter means is relatively high, the motor is underspeed.

The occurrence of a tachometer pulse on conductor 13 is effective to apply an inhibit signal to the input of second counter means 18 by way of conductor 22. This inhibit signal causes the count which then exists in counter means 18 to be frozen or stored.

The tachometer pulse on conductor 13 is also effective to provide an enable signal to the input of first counter means 17 by way of conductor 23. This enable input causes first counter means 17 to again advance under the control of oscillator 14.

The low count stages of counter means 17 are applied to conductors 24, 25 and 26 and are connected to one input of decode means 27. As counter means 17 advances toward the given high order count represented by output 19, the low order stages of this counter means continually change and the resultant signals on conductors 24, 25 and 26 are decoded with the steady-state signals on output conductors 28, 29 and 30 of counter means 18.

For simplicity, decode means 27 has been shown as decoding three stages of counter means 18 with three stages of counter means 17. It will be recognized by those skilled in the art that this is only a representative showing and that other schemes for decoding second counter means 18 are apparent. In any event, decode means 27 is effective to select a mode of motor energization in accordance with the count then stored in counter means 18. Since the output pulses of digital tachometer 12 are representative of a given distance traveled by motor 10 between two adjacent pulses, and since oscillator 14 provides a stable time reference, the count stored in second counter means 18 is representative of the time which it has taken motor 10 to travel a given distance. Thus, decoding of the count stored in counter means 18 can be used to sense overspeed, underspeed or desired speed operation of motor 10.

The output of decode means 27 appears on conductor 31 and is effective to control motor energizing means 32 until the occurrence of the next tachometer pulse. The output on conductor 31 is also effective to provide a reset input on conductor 33 to reset counter means 18 to its initial state, for example a count of zero, preparing this counter means for the next sampling interval. A reset appears on conductor 13 before an output appears on output 19 of counter means 17.

As an alternative to this decode structure, the output on conductors 28, 29 and 30 can be sampled, as by connection to a digital-to-analog converter whose output controls motor energizing means 32 and resets second counter means 18.

Figure 2:
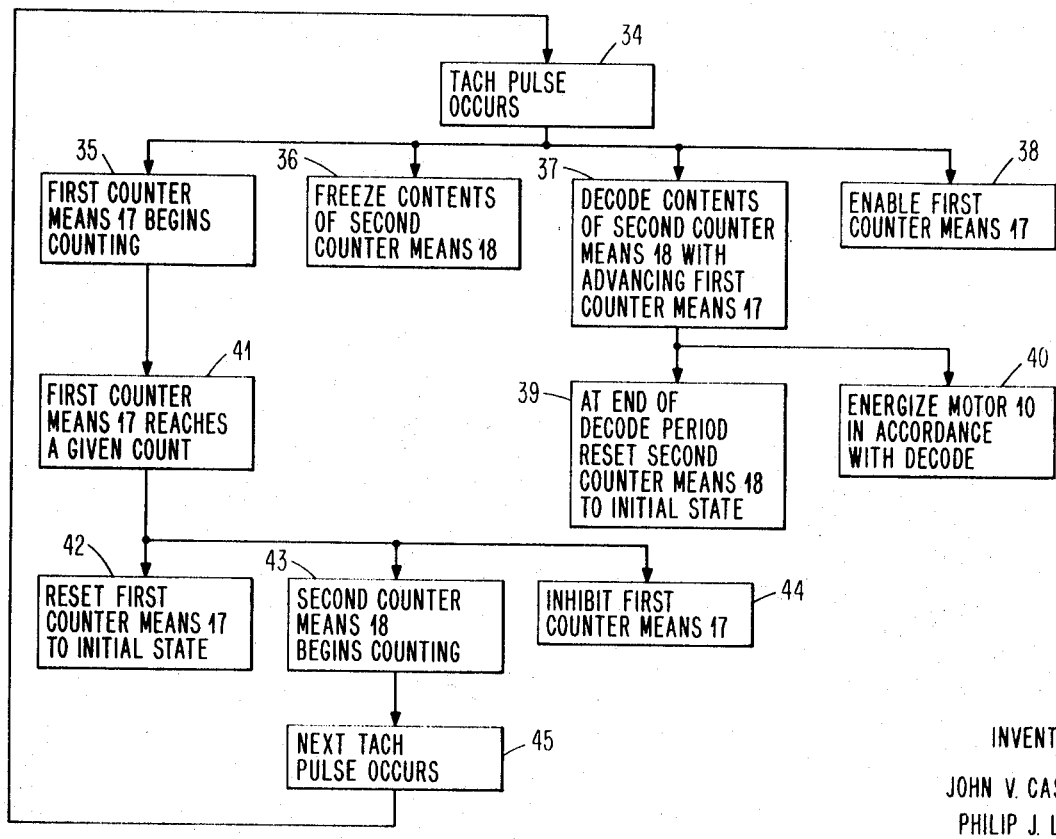
FIG. 2 is a flow chart which is helpful in understanding the operation of the apparatus of FIG. 1.

FIG. 2 facilitates the understanding of the structure of FIG. 1. Box 34 is indicative of the occurrence of a tachometer pulse. As a result of this tachometer pulse, four functions occur. The first function is indicated by block 38, which indicates that first counter means 17 is enabled so that it may begin counting. The second function is indicated by block 35 which indicates that first counter means 17 begins counting. The third function is indicated by block 36 which indicates that the contents of second counter means 18 is frozen or stored. The fourth function is indicated by block 37 which indicates that the contents of second counter means 18 is decoded with the advancing first counter means 17.

In point of time, the next event to occur is indicated by block 39 which indicates that at the end of the decode period the second counter means 18 is reset to its initial state. Also, box 40 indicates that the motor is now energized in accordance with the decoding which has occurred.

Next in point of time first counter means 17 reaches a given high order count, as indicated by box 41. Three functions now occur as indicated by boxes 42, 43 and 44; namely, first counter means 17 is reset to an initial state; second counter means 18 begins counting, and first counter means 17 is inhibited from further counting.

The next event to occur is a subsequent tachometer pulse this being represented by box 45. The interval between boxes 34 and 45 represents a given distance of movement of motor 10. By way of example, tachometer 12 may provide 500 pulses for 360° rotation of motor 10 and oscillator 14 may be a 2.25 MHz oscillator.

Figure 3:
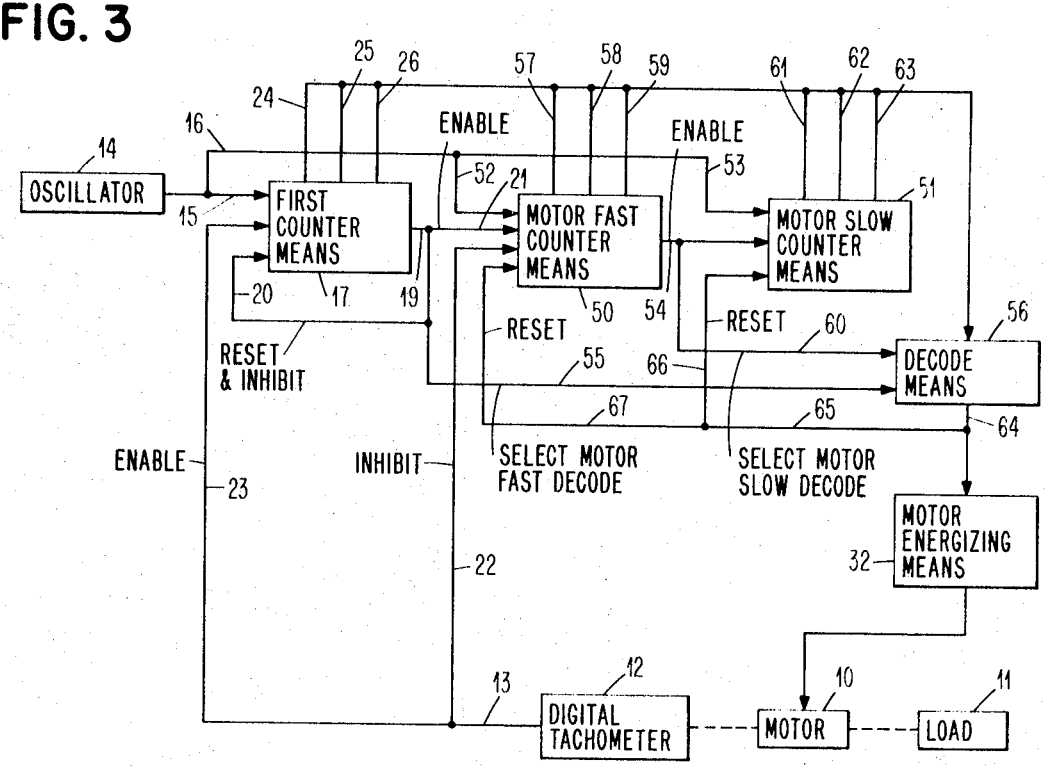
FIG. 3 is a showing of a second embodiment of the present invention.

FIG. 3 discloses a second embodiment of the present invention wherein the second counter means 18 of FIG. 1 is disclosed as two separate counter means, namely a motor fast counter means 50 and a motor slow counter means 51. In this figure, a structure which is substantially identical to the corresponding structure of FIG. 1 has been identified by a like reference numeral. Again it will be noted that the output of oscillator 14 is connected by means of conductor 16 to conductors 52 and 53 which connect to the inputs of counter means 50 and 51 respectively. Counter means 50 is enabled to begin counting by means of an output on conductor 21, indicating that first counter means 17 has reached a given high order count.

Counter means 51 is similarly enabled by an output on conductor 54, this output being indicative of the fact that counter means 50 has reached a given high order count.

As mentioned in connection with FIG. 1, the possibilities exist that motor 10 is either overspeed or underspeed. An output on conductor 19 of counter means 17 is effective to provide a signal on conductor 55 which is applied to one input of a decode means 56. This output sets decode means 56 in a motor fast decode mode of operation, whose function will be described.

If the next tachometer pulse occurs before counter means 50 has advanced to provide an output on conductor 54, then the output conductors 24, 25 and 26 of counter means 17 are decoded with the count which is frozen in counter means 50, whose output appears on conductors 57, 58 and 59.

On the other hand, if motor 10 is slow, counter means 50 will have advanced to a given high order count to provide an output on conductor 54. This output not only enables counter means 51 to begin counting, but also provides a signal on conductor 60, causing decode mean 56 to select a motor slow decode mode of operation wherein the advancing state of counter means 17 is decoded with a count which is frozen in counter means 51 to provide an output on conductors 61, 62 and 63.

By way of example, should the motor be fast, decode means 56 is effected to provide an output on conductor 64 which is applied to the input of motor-energizing means 32 to cause motor 10 to be reverse energized or plugged in accordance with the quantitative measurement of the overspeed condition. Should the motor be slow, then the output of counter means 51 is decoded to cause motor 10 to be forward energized in accordance with this quantitative measurement of the underspeed condition.

The output of decode means 56 is also effective to provide a signal on conductor 65. This signal is applied to conductors 66 and 67 to reset counter means 50 and 51 to their initial states, thus preparing these counter means for their operation in the subsequent speed-error sampling period.

FIG. 4 is a flow chart, similar to the flow chart of FIG. 2, which is helpful in understanding the operation of the apparatus of FIG. 3. Again, like reference numerals have been used to identify boxes defining similar functions. In this figure, box 68 indicates the function which occurs when an output appears on conductor 55 of FIG. 3, namely that the motor fast counter means 50 is selected for decoding. Box 69 indicates that this same counter means then begins counting.

Subsequently, two possible events may occur. The first event is represented by broken line 70, this being the occurrence of a tachometer pulse, represented by box 71, before counter means 50 reaches a given high order count to provide an output on conductor 54. When this occurs, the motor is running faster than the desired speed and counter means 50 is decoded with advancing counter means 17, as indicated by box 37 of FIG. 4, and motor 10 is energized accordingly.

The second situation which may occur is represented by broken line 72 of FIG. 4, namely that the motor is experiencing an underspeed condition. When this occurs, counter means 50 reaches a given high order count before the next tachometer pulse occurs, this being represented by box 73. When counter means 50 reaches this count, four functions occur, as represented by boxes 74, 75, 76 and 77 of FIG. 4. Box 74 indicates that the previous selection of counter means 50 for decoding is cancelled. Box 75 indicates that counter means 50 is reset to its initial state. Box 76 indicates that counter means 51 is selected for decoding. Box 77 indicates that counter means 51 begins counting.

The next event to occur is indicated by box 78, namely the next tachometer pulse occurs.

In FIG. 4, the same physical distance is travelled by motor 10 between box 34 and either of the boxes 71 or 78. However, the time interval is different. In the case of box 71, a short time interval indicates that the motor is fast, whereas in the case of box 78 a longer time interval indicates that the motor is slow. Decoding means 56 of FIG. 3 is effective to select the proper mode of motor energization by controlling motor-energizing means 32 to accordingly adjust the speed of motor 10.

The foregoing description of the present invention is sufficient to enable any person skilled in the art to originate various detailed implementations of this invention. A representative detailed implementation is shown in FIG. 5. While a correspondence between the structure of FIG. 1 and FIG. 5 can be readily shown, FIG. 5 is more closely associated with the structure of FIG. 3 in that the second counter means is represented as two separate counters in FIG. 5.

In summary, FIG. 5 provides for both an accelerate mode and a run mode of operation of motor 10. During the accelerate mode, bistable trigger 88 remains in a set condition until such time as a high order count no longer exists in counter 91. During this accelerate mode, the motor is continuously energized and its speed quickly increases from zero velocity to approximately the desired running velocity.

Thereafter, if the motor is fast, bistable motor fast trigger 103 is set and counter 105 is in the process of counting when a tachometer pulse occurs. Since the trigger 103 is set, the fast decode section 119 of decode means 56 is utilized to decode the count stored in counter 105.

If the motor is slow, bistable motor slow trigger 90 is set and counter 91 is in the process of counting when a tachometer pulse occurs. Since trigger 90 is set, the slow decode section 118 of decode means 56 is utilized to decode the count stored in counter 91.

Referring to FIG. 5, the input commands to the servomechanism consist of a start command 81, a forward command 82 and a backward command 83. A voltage always appears on conductor 81 when rotation of motor 10 is desired. A voltage concurrently appears on a selected one of the conductors 82 and 83, depending upon the desired direction of rotation of the motor.

Motor 10 whose speed is to be controlled by the structure of FIG. 5 is disclosed in FIG. 7 wherein this motor is shown as being energized by a bridgetype driver circuit wherein four transistors A, B, C and D bidirectionally control the rotation of motor 10. As will be apparent from the following description, the four output AND-gates 84, 85, 86 and 87 of FIG. 5 control the state of conduction of the four transistors shown in FIG. 7. More specifically, AND-gate 84 is a "forward slow" output wherein transistors A and D are conductive to cause motor 10 to rotate in a forward direction. AND-gate 86 is a "backward slow" AND gate whose output is effective to render transistors B and C conductive to cause motor 10 to rotate in a backward direction. AND-gate 85 is a "forward fast" AND gate whose output is effective to reduce the forward speed of rotation of motor 10. This could be accomplished by deenergizing the motor to cause it to coast, by dynamically braking the motor, or, as is indicated in FIG. 5, by reverse energizing or plugging the motor by rendering transistors B and C conductive. AND-gate 87 is a "backward fast" gate whose output is effective to render transistors A and D conductive to thereby plug motor 10 for backward rotation. It will be recognized that the output of AND-gate 87 could also institute a coast mode or a dynamic brake mode or operation of the motor.

Upon initial starting, it is necessary to continuously energize motor 10 to provide a short time period of acceleration up to approximately the desired running speed. This acceleration interval is provided by bistable acceleration trigger 88 which is set to a first state by the occurrence of a start command on conductor 81. The output of trigger 88 sets bistable trigger 89 to a state where one of the gates 84 or 86 is enabled, depending upon the command direction of rotation. It is readily apparent that forward command is effective to select gate 84 whereas backward command is effective to select gate 86.

The occurrence of a start command also sets a motor slow bistable trigger 90 to a state wherein the third necessary enabling input is provided to the selected one of the gates 84 and 86. Thus, motor 10 is energized to institute the begin of the acceleration interval.

A further function of the occurrence of a start command on conductor 81 is to preset a high order count into a four stage binary motor slow counter 91, this counter corresponding to the motor slow counter means 51 of FIG. 3. So long as this count remains in counter 91, trigger 88 remains set and the acceleration interval continues.

As the motor accelerates, the individual pulses occuring from tachometer 12 are separated by shorter and shorter time intervals indicating that the motor speed is increasing. So long as the motor speed is less than 95 percent of its desired speed, counter 91 remains in a condition such that no signal appears on conductor 92 in coincidence with a tachometer pulse on conductor 93. Thus, AND-gate 94 is not enabled.

As motor speed continues to increase, the motor very shortly reaches 95 percent of its desired speed, AND-gate 94 is enabled and the output of this gate resets trigger 88 to terminate the acceleration interval. Thereafter, motor 10 is energized in accordance with the quantitative measurement of speed error.

More specifically, the output of tachometer 12 is applied to a pulse shaping network 95 and the output of this network conditions one input of AND-gate 96 to enable oscillator 14 to advance an eight-stage binary counter 97. This tachometer pulse is also effective, by way of OR-gate 98 to set counter 97 to an initial low order state. Other functions achieved by the tachometer pulse are to set bistable triggers 99, 100 and 89.

As counter 97 advances, a high order count is eventually reached where an output is provided on conductor 101. This output is effective to reset trigger 99, removing an enabling input on conductor 102, thus inhibiting gate 96 and further counting of counter 97. Furthermore, output 101 is effective to set a fast bistable trigger 103 and to reset trigger 100, enabling AND-gate 104 such that oscillator 14 is now connected to advance a three-stage binary fast counter 105, the oscillator output being controlled through an AND-gate 106 which is enabled by a signal appearing on conductor 107 as a result of fast trigger 103 being set.

If the motor is running fast, the next tachometer pulse will occur before counter 105 has been filled. If a tachometer pulse does in fact occur while counter 105 is still counting, this pulse sets trigger 100 to interrupt the counting of counter 105 and also sets reset trigger 99 and trigger 89. The setting of trigger 99 enables gate 96 such that counter 97 again begins counting. The advancing of this counter is decoded with the count which is now stored in counter 105 to determine the time duration in which trigger 89 remains in a set condition to condition one of the AND-gates 85 and 87 and thus provide for conduction deceleration of motor 10.

Figure 6:
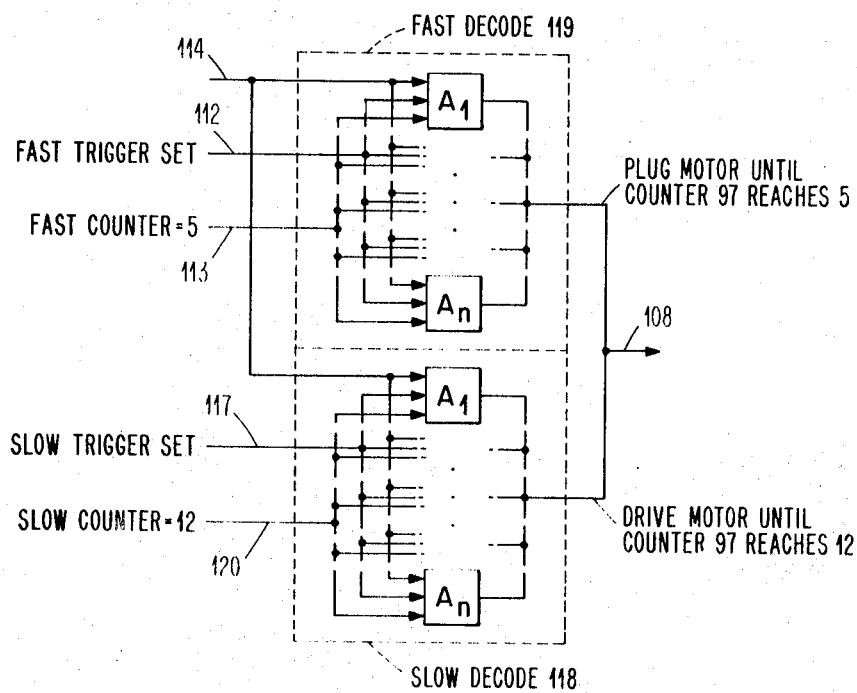
FIG. 6 is a logic diagram which is helpful in explaining the operation of decoding network of FIG. 5.

The specific decode means 56 of FIG. 5 may be such as disclosed in FIG. 6, having a fast decode section 119 and a slow decode section 118. The output conductor 108 of decode means 56 is applied as one input to AND-gate 109, the other input 110 being supplied by trigger 99. So long as AND gate 109 is enabled by both of its inputs, its output conductor 111 is ineffective to reset trigger 89 and transistors A and D of FIG. 7 remain conductive.

When decoding has been completed, and an output appears on conductor 111, the active one of the triggers 103 and 90 is reset and the corresponding one of the active counters 105 and 91 is reset to its low order initial state, it being noted that if counter 91 is active, counter 105 was previously reset to its initial state upon the occurrence of an output on conductor 115.

Referring to FIG. 6, an exemplary decode means 56 is disclosed wherein an input on conductor 112 indicates that fast trigger 103 is set. The specific count in counter 105 is contained on conductor 113 and, by way of example is represented as a count of 5, indicating that the tachometer pulse occurred 5 cycles of oscillator 14 after counter 97 reached a given high order count. The one stage and the four stage of counter 105 enables certain AND gates of the fast decode section 119 of decode means 56. The output of certain low order stages of advancing counter 97 are applied to conductor 114 and to all of the AND gates of decode means 56. In this manner, the count stored in counter 105 is decoded with advancing counter 97 to provide an output on conductor 108 to condition AND-gate 109 in accordance with this decoding and thus decelerate motor 10 in accordance with the quantitative state of the overspeed condition.

Had the motor been underspeed, counter 105 would provide an output on conductor 115, FIG. 5. This output is effective to inhibit AND-gate 106 to prevent further counting of counter 105. Output 115 is also effective to reset fast trigger 103 and to set slow bistable trigger 90. The output of slow trigger 90 enables AND-gate 116, thereby gating oscillator 14 into four stage binary motor slow counter 91, causing this counter to advance. Since slow trigger 90 is set, a subsequent tachometer pulse is effective to set trigger 89, causing a selected one of the AND-gates 84 or 86 to be enabled to accelerate motor 10 in accordance with the decoding of the then existing count in counter 91 with the advancing low order stages of counter 97.

Referring to FIG. 6, when slow trigger 90 is set, a voltage appears on conductor 117 to enable all of the AND gates in the motor slow decode section 118 of decode means 56. The state of count in slow counter 91 is presented to certain of the AND gates of section 118 of decode means 56 by way of conductor 120, whereas the advancing state of counter 97 is again provided to all of these AND gates by means of conductor 114. In FIG. 6, it is assumed that the tachometer pulse occurred with a count of 12 stored in counter 91. In this instance, an output is provided on 108 until counter 97 reaches a count of 12 whereupon trigger 89 is reset.

While the invention has been particularly shown and described with reference to preferred embodiments thereof, it will be understood by those skilled in the art that various changes in form and details may be made therein without departing from the spirit and scope of the invention.

What is claimed is:
1. A digital speed servomechanism, comprising:
    a variable speed energizable member to be moved at a desired speed,
    a digital tachometer connected to said member providing a variable frequency output signal whose frequency increases with the speed of said member,
    an oscillator having an output signal whose frequency is higher than the frequency of said tachometer output signal when said member is moving to said desired speed, and whose frequency has a known relationship to said desired speed,
    a first counter means connected to be incremented from an initial low order state by said oscillator output signal,
    second counter means connected to be incremented from an initial low order state by said oscillator output means,
    first means responsive to each individual pulse of said tachometer output signal and effective as a result thereof to enable said first counter means to begin counting,
    second means thereafter responsive to a given high order count in said first counter and effective as a result thereof to enable said second counter means to begin counting,
    and third means responsive to the next pulse of said tachometer output signal and effective to inhibit counting of said second counter means and to quantitatively energize said member in accordance with the count which existed in said second counter means at the time of said next pulse of said tachometer output signal.

2. A digital speed servomechanism as defined in claim 1 including acceleration means operable to energize said member upon a command to increase its speed from zero speed to said desired speed, and means controlled by the absence of a high order count in said second counter means to terminate operation of said acceleration means.

3. A digital speed servomechanism as defined in claim 1 wherein said third means includes decoding means effective to energize said member in accordance with a comparison of said oscillator output signal and the count which existed in said second counter means.

4. A digital speed servomechanism as defined in claim 3 including means to reset said first counter means to said initial state, to thereby facilitate the incrementing thereof by said oscillator output signal, wherein said decoding means includes a comparison of low order stages of said first counter means and said second counter means.

5. A digital speed servomechanism as defined in claim 4 including means responsive to said decode means and effective to reset said second counter means to said initial state prior to said first counter means reaching said high order count.

6. A digital speed servomechanism as defined in claim 1 wherein said second means includes bistable reset means which is triggered to a first state by each individual pulse of said tachometer output signal and is thereafter triggered to a second state upon said given high order count being accumulated in said first counter means, and means controlled by said bistable reset means when in said first state to enable said first counter means to begin counting and when in said second state to inhibit counting thereof.

7. A digital speed servomechanism as defined in claim 6 wherein said bistable reset means when in said first state enables said third means.

8. A digital speed servomechanism as defined in claim 7 wherein said third means includes second bistable means having a first state enabling energization of said member and having a second state inhibiting energization of said member, and including means controlled by said next pulse of said tachometer output signal effective to trigger said second bistable means to said first state, and means controlled in accordance with the count which existed in said second counter means at the time of said next pulse of said tachometer output signal to thereafter trigger said second bistable means to said second state.

9. A digital speed servomechanism as defined in claim 8 wherein said third means includes digital decode means responsive to the count which existed in said second counter means at the time of said next pulse of said tachometer output signal and also responsive to the changing state of said first counter means to trigger said second bistable means to said second state at a subsequent time which is determined by said count contained in said second counter means, and further means responsive to said decoding means at said subsequent time to reset said second counter means to said initial state.

10. A digital speed servomechanism as defined in claim 9 including acceleration bistable trigger means operable in a first state to energize said member, and mans controlled by the absence of a high order count in said second counter means at the time of said next pulse of said tachometer output signal to reset said acceleration trigger means to a second state.

11. A digital speed servomechanism as defined in claim 1, including:
    third counter means connected to be incremented from an initial low order state by said oscillator output signal,
    means responsive to a given high order count in said second counter means and effective as result thereof to inhibit further counting of said second counter means and to enable counting of said third counter means, and wherein said third means additionally inhibits counting of said third counter means upon the occurrence of said next pulse of said tachometer output signal, and energizes said member in accordance with the count which existed in a selected one of said second and third counter means at the time of said next pulse of said tachometer output signal.

12. A digital speed servomechanism as defined in claim 11, including means responsive to a given high order count in said second counter means to reset said second counter means to said initial state.

13. A digital speed servomechanism as defined in claim 11 wherein the occurrence of said next pulse of said tachometer output signal prior to said second counter means reaching said given high order count causes a first mode of energization of said member in accordance with the state of said second counter means, and wherein the occurrence of said next pulse of said tachometer output signal after said second counter means reaches said given high order count causes a second mode of energization of said member in accordance with the state of said third counter means.

14. A digital speed servomechanism as defined in claim 13 wherein said first mode of energization is effective to reduce the speed of said member and said second mode of energization is effective to increase the speed of said member.

15. A digital speed servomechanism as defined in claim 14 wherein said third means included digital decoding means operable in a motor fast decode mode to be responsive to the count contained in said second counter means upon the occurrence of said next pulse of said tachometer output signal prior to said second counter means reaching said given high order count, and operable in a motor slow mode to be responsive to the count contained in said third counter means upon the occurrence of said next pulse of said tachometer output signal after said second counter means has reached said given high order count, and further means responsive to said decoding means terminating a decoding period to reset said second and said third counter means to said initial low order state.

16. A digital speed servomechanism as defined in claim 15 wherein said energizable member is a direct current motor and wherein said first mode of energization is plugging energization of said motor and said second mode of energization is driving energization of said motor.

17. A digital speed servomechanism as defined in claim 16 including a bistable acceleration trigger means having a first state which affects energization of said motor, means controlled upon the occurrence of a command to energize said motor to place said acceleration trigger means in said first state, and means controlled by the absence of a high order count in said third counter means at the time of said next pulse of said tachometer output signal to place said acceleration trigger means in a second state.

* * * * *